United States Patent
Ellis (10) Patent No.: US 6,392,834 B1
(45) Date of Patent: May 21, 2002

(54) CONCENTRIC SPACING OF VIRTUAL DATA TRACKS USING RUN-OUT COMPENSATION

(75) Inventor: Timothy F. Ellis, Tonka Bay, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/394,756

(22) Filed: Sep. 13, 1999

Related U.S. Application Data (60) Provisional application No. 60/100,235, filed on Sep. 14, 1998.

(51) Int. Cl.$^7$ .............................................. G11B 5/596
(52) U.S. Cl. ................................. 360/77.04; 360/77.03
(58) Field of Search ........................ 360/77.04, 77.08, 360/48, 77.03; 369/48

(56) References Cited

U.S. PATENT DOCUMENTS

| | | | |
|---|---|---|---|
| 3,725,764 A | 4/1973 | Oswald ........................ 318/629 |
| 4,890,172 A | 12/1989 | Watt et al. ................. 360/77.04 |
| 5,585,976 A | 12/1996 | Pham ....................... 360/77.04 |
| 5,793,559 A | * 8/1998 | Shepherd et al. ..... 360/77.04 X |
| 5,825,578 A | * 10/1998 | Shrinkle et al. .......... 360/77.04 |
| 5,835,300 A | 11/1998 | Murphy et al. ........... 360/77.05 |
| 6,097,565 A | * 8/2000 | Sri-Jayantha et al. .... 360/78.09 |
| 6,115,203 A | * 9/2000 | Ho et al. .................. 360/77.04 |
| 6,141,175 A | * 10/2000 | Nazarian et al. ......... 360/77.04 |

FOREIGN PATENT DOCUMENTS

| | | |
|---|---|---|
| EP | 0 130 248 A1 | 1/1985 |
| EP | 0 130 248 A1 | 9/1985 |
| WO | WO 93/06595 | 4/1993 |
| WO | WO 97/45833 | 12/1997 |

* cited by examiner

*Primary Examiner*—David Hudspeth
*Assistant Examiner*—K. Wong
(74) *Attorney, Agent, or Firm*—Joseph R. Kelly; Westman, Champlin & Kelly, P.A.

(57) ABSTRACT

Disclosed are a method and apparatus for compensating for written-in repeatable run-out in a disc drive. A written-in repeatable run-out compensation value is stored in a servo field residing on a track. The compensation value is subtracted from a corresponding servo value to obtain a compensated servo value. The head is positioned relative to the track based upon the compensated servo value. Also disclosed is a method for determining the written-in repeatable run-out compensation values wherein the head is positioned over the intended center of the track so that the head follows an essentially circular path relative to the disc surface. For each revolution of the disc, a servo value indicating the position of the head relative to the track at the servo field is determined. The servo values are averaged over a number of revolutions in order to extract a non-repeatable portion of the run-out.

6 Claims, 5 Drawing Sheets

CONCENTRIC SPACING OF VIRTUAL DATA TRACKS USING RUN-OUT COMPENSATION

REFERENCE TO RELATED APPLICATIONS

This application claims the benefit of U.S. Provisional Patent Application No. 60/100,235 entitled "CONCENTRIC SPACING OF VIRTUAL DATA TRACKS USING RUN-OUT COMPENSATION," filed on Sep. 14, 1998.

The following U.S. patent applications, assigned to the same assignee as the present invention, are related to the present application:

U.S. patent application Ser. No. 09/106,443, now U.S. Pat. No. 6,069,764, entitled "COMPENSATION FOR REPEATABLE RUN-OUT ERROR", filed on Jun. 29, 1998.

U.S. patent application Ser. No. 09/370,823, entitled "COMPENSATION FOR REPEATABLE RUNOUT ERROR", filed on Aug. 9, 1999.

U.S. patent application Ser. No. 09/394,160 entitled "MULTI-RATE SERVO DISC DRIVE WITH MULTI-RATE WRITTEN-IN REPEATABLE RUN-OUT COMPENSATION", filed on the same day as the present application.

FIELD OF THE INVENTION

The present invention relates generally to disc drive data storage systems. More particularly, the present invention relates to compensation for errors in servo systems.

BACKGROUND OF THE INVENTION

Disc drives read and write information along concentric tracks formed on discs. To locate a particular track on a disc, disc drives typically use embedded servo fields on the disc. These embedded fields are utilized by a servo subsystem to position a head over a particular track. The servo fields are written onto the disc when the disc drive is manufactured and are thereafter simply read by the disc drive to determine position. A multi-rate servo system samples the position of the head relative to a particular track at a particular sampling rate and adjusts the position of the head at a rate that is a multiple of the sampling rate by estimating the position of the head between the measured position samples.

Ideally, a head following the center of a track moves along a perfectly circular path around the disc. However, two types of errors prevent heads from following this ideal path. The first type of error is a written-in error that arises during the creation of the servo fields. Written-in errors occur because the write head used to produce the servo fields does not always follow a perfectly circular path due to unpredictable pressure effects on the write head from the aerodynamics of its flight over the disc, and from vibrations in the gimbal used to support the head. Because of these written-in errors, a head that perfectly tracks the path followed by the servo write head will not follow a circular path.

The second type of error that prevents circular paths is known as a track following error. Track following errors arise as a head attempts to follow the path defined by the servo fields. The track following errors can be caused by the same aerodynamic and vibrational effects that create written-in errors. In addition, track following errors can arise because the servo system is unable to respond fast enough to high frequency changes in the path defined by the servo fields.

Written-in errors are often referred to as repeatable run-out errors because they cause the same errors each time the head passes along a track. As track densities increase, these repeatable run-out errors begin to limit the track pitch. Specifically, variations between the ideal track path and the actual track path created by the servo fields can result in an inner track path that interferes with an outer track path. This is especially acute when a first written-in error causes a head to be outside of an inner track's ideal circular path and a second written-in error causes the head to be inside of an outer track's ideal circular path. To avoid limitations on the track pitch, a system is needed to compensate for repeatable run-out errors.

The present invention provides a solution to this and other problems and offers other advantages over the prior art.

SUMMARY OF THE INVENTION

The present invention relates to compensating for written-in repeatable run-out in disc drives.

One embodiment of the present invention is directed to a method of compensating for written-in repeatable run-out in a disc drive. A written-in repeatable run-out compensation value is stored in a servo field residing on a track. The compensation value is subtracted from a corresponding servo value to obtain a compensated servo value. Then the head is positioned relative to the track based upon the compensated servo value.

In one embodiment of the present invention, the servo value from which the written-in repeatable run-out compensation value is subtracted is the position error value.

Further, in one embodiment, the written-in repeatable run-out compensation values are determined by first rotating the disc about its spindle axis. The head is then positioned over the intended center of the track so that the head follows an essentially circular path relative to the disc surface. For each revolution of the disc, a servo value indicating the position of the head relative to the track at the servo field is determined. This step of determining a servo value is repeated over a plurality of revolutions and the servo values obtained are averaged in order to extract a non-repeatable portion of the run-out, resulting in a written-in repeatable run-out compensation value.

Another embodiment of the present invention is directed to a disc drive having a servo loop, a disc, a head, a servo controller, an actuator and a compensation circuit. The disc is capable of storing data on a track. The track includes servo fields capable of storing servo information used to indicate the position of a head relative to the track. The servo fields are also capable of storing a written-in repeatable run-out compensation value indicative of an amount of written-in repeatable run-out of the track at a given portion of the track. The head is capable of sensing the servo information located on the disc and of producing a servo position signal therefrom. The servo position signal is combined with a reference signal to produce a position error signal indicative of the difference between the actual and desired positions of the head relative to the track. The servo controller is capable of generating a servo control signal in response to a received position error signal. The actuator is coupled to the servo controller and is capable of moving the head in response to the servo control signal. The compensation circuit is capable of retrieving a written-in repeatable run-out compensation value stored in a servo field of the track and providing the compensation value to a subtractor. The subtractor is capable of subtracting the written-in repeatable run-out compensation value from a servo signal in the servo loop.

These and various other features as well as advantages which characterize the present invention will be apparent upon reading of the following detailed description and review of the associated drawings.

DETAILED DESCRIPTION OF ILLUSTRATIVE EMBODIMENTS

Figure 1:
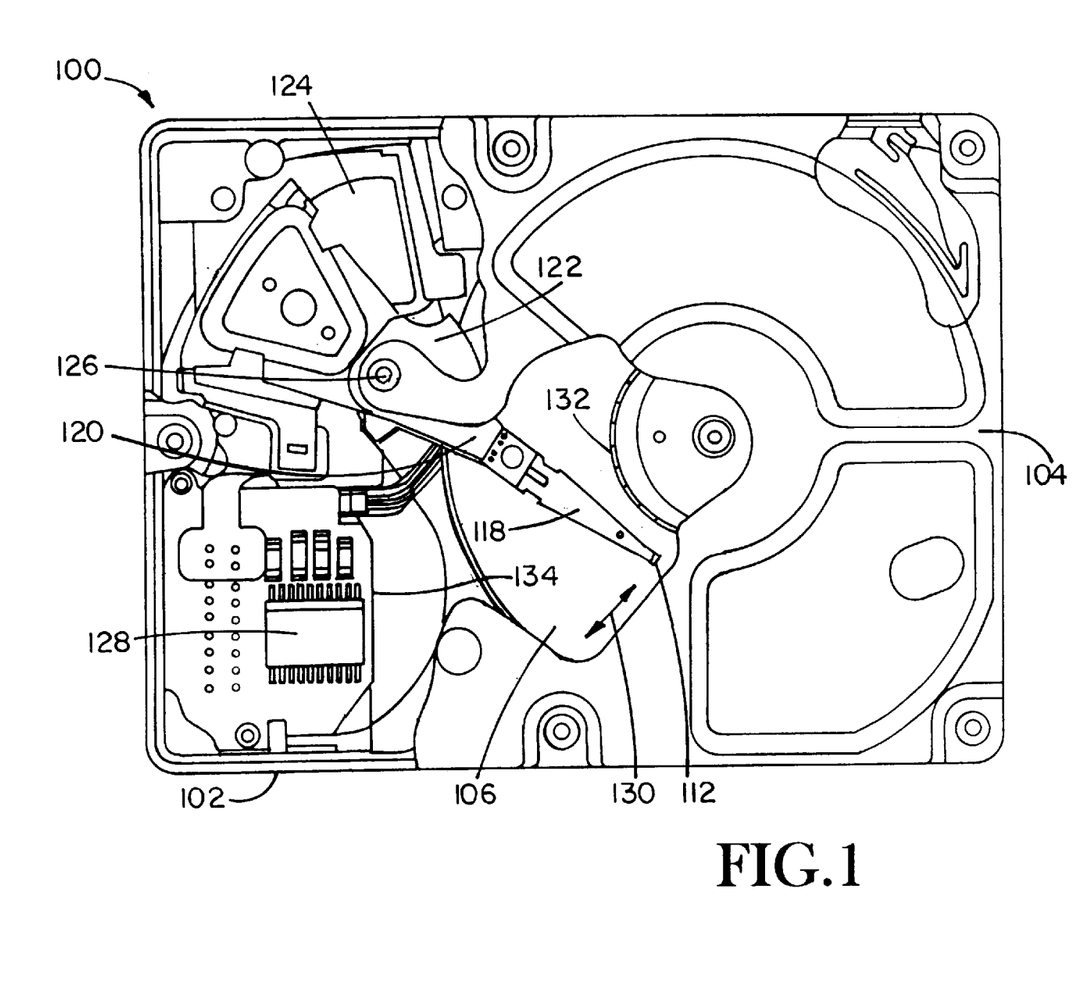
FIG. 1 is a plan view of a disc drive of the present invention.

FIG. 1 is a plan view of a disc drive 100 that includes a housing with a base plate 102 and a top cover 104 (sections of top cover 104 are removed for clarity). Disc drive 100 further includes a disc pack 106, which is mounted on a spindle motor (not shown). Disc pack 106 can include a plurality of individual discs which are mounted for co-rotation about a central axis. Each disc surface has an associated head gimbal assembly (HGA) 112 which is mounted to disc drive 100 for communication with the disc surface. Each HGA 112 includes a gimbal and a slider, which carries one or more read and write heads. Each HGA 112 is supported by a suspension 118 which is in turn attached to a track accessing arm 120 known generally as a fixture, of an actuator assembly 122.

Actuator assembly 122 is rotated about a shaft 126 by a voice coil motor 124, which is controlled by servo control circuitry within internal circuit 128. HGA 112 travels in an arcuate path 130 between a disc inner diameter 132 and a disc outer diameter 134. When the head is properly positioned, write circuitry within internal circuitry 128 encodes data for storage on the disc and sends an encoded signal to the head in HGA 112, which writes the information to the disc. At other times, the read head in HGA 112 reads stored information from the disc and provides a recovered signal to detector circuitry and decoder circuitry within internal circuitry 128 to produce a recovered data signal.

Figure 2:
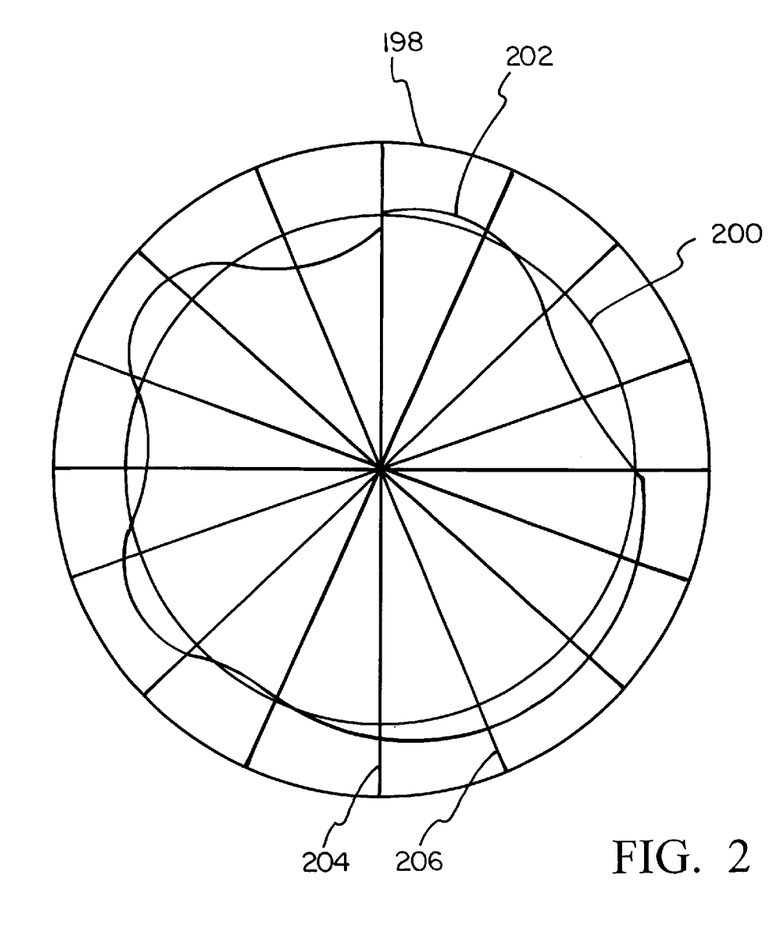
FIG. 2 is a top view of a section of a disc showing an ideal track and a realized written-in track.

FIG. 2 is a top view of a section 198 of a disc showing an ideal, perfectly circular track 200 and an actual track 202. Section 198 includes a plurality of radially extending servo fields such as servo fields 204 and 206.

The servo fields include servo information that identifies the location of actual track 202 along disc section 198.

Any variation in the position of a head away from circular track 200 is considered a position error. The portions of track 202 that do not follow circular track 200 create written-in repeatable run-out position errors. A position error is considered a repeatable run-out error if the same error occurs each time the head passes a particular circumferential location on the disc. Track 202 creates a repeatable run-out error because each time a head follows the servo fields that define track 202, it produces the same position error relative to ideal track 200.

Under the present invention, a head attempting to write to or read from track 202 will not follow track 202 but instead will more closely follow perfectly circular track 200. This is accomplished using a compensation signal that prevents the servo system from tracking repeatable run-out errors resulting from the irregular shape of track 202.

Figure 3:
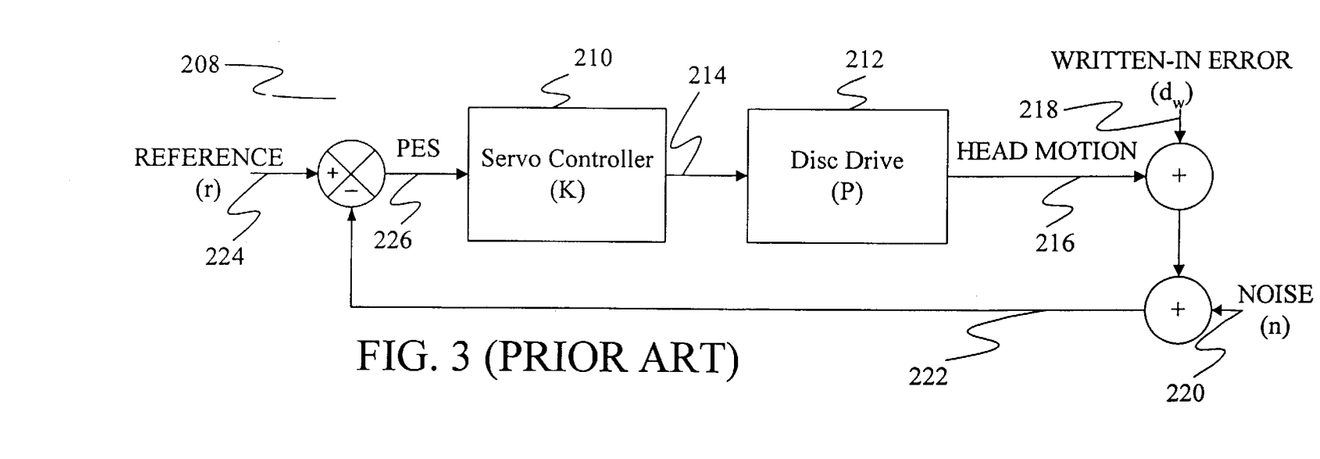
FIG. 3 is a block diagram of a prior art servo loop.

FIG. 3 is a block diagram of a servo loop 208 of the prior art. The servo loop includes a servo controller 210, having a gain of "K" and a disc drive 212 having a gain of "P". Servo controller 210 is the servo control circuitry within internal circuit 128 of FIG. 1. Disc drive 212 includes actuator assembly 122, voice coil motor 124, track accessing arm 120, suspension 118, and head gimbal assembly 112, all of FIG. 1.

Servo controller 210 generates a control current 214 that drives the voice coil motor of disc drive 212. In response, disc drive 212 produces head motion 216. In FIG. 3, the written-in error, $d_w$, is represented as a separate input signal 218 even though the written-in error would otherwise appear implicitly in head motion 216. The separation of written-in error 218 from head motion 216 provides a better understanding of the present invention. In addition, noise in the servo system has been separated and appears as noise 220, which is added to the head motion. The sum of head motion 216, written-in error 218 and noise 220 results in the head's servo position signal 222. Servo position signal 222 is subtracted from a reference signal 224, which is generated by internal circuitry 128 based on a desired location for the head. Subtracting servo position signal 222 from reference signal 224 produces position error signal 226 which is input to servo controller 210.

Figure 4:
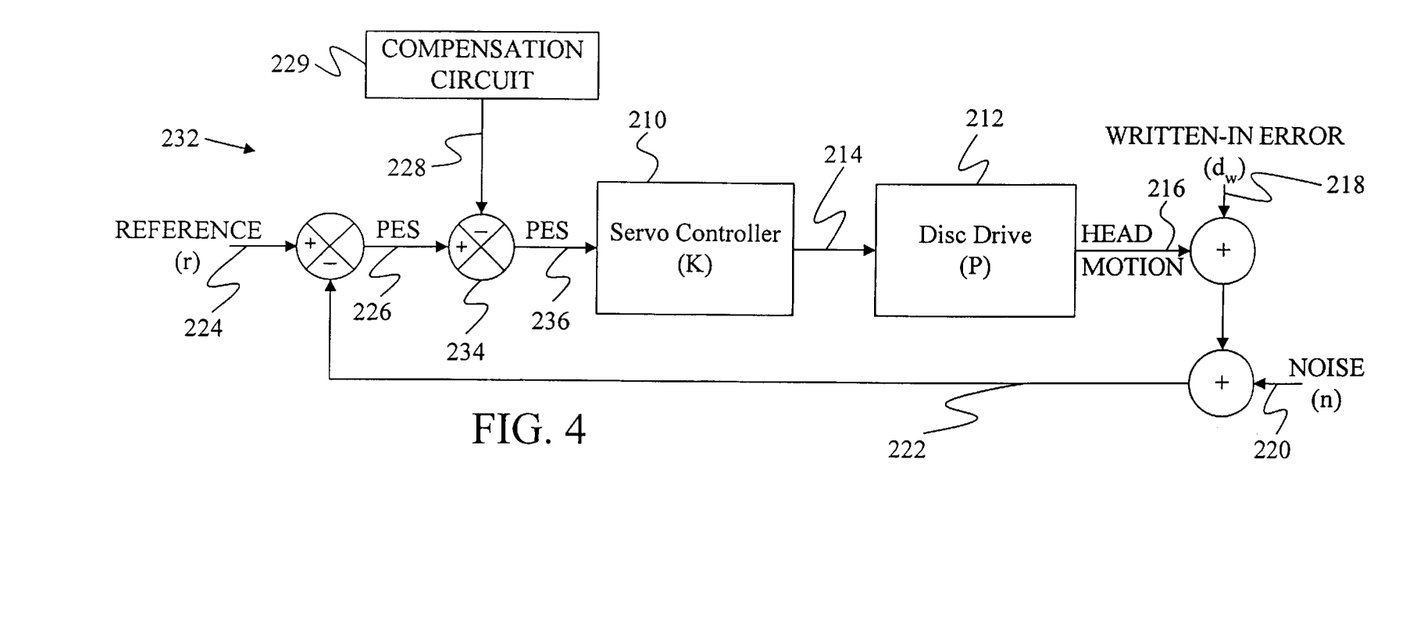
FIG. 4 is a block diagram of a servo loop according to an illustrative embodiment of the present invention.

Heads in servo loops of the prior art move in response to written-in errors. This movement is undesirable since it places the head outside of the ideally circular track path. To eliminate the unwanted head motion created by the written-in error, the present invention subtracts a compensation signal from the servo loop of the prior art. This subtraction is shown in the servo loop 232 of FIG. 4. In FIG. 4, the elements that are common to FIG. 3 are numbered the same. Compensation signal 228 is produced by compensation circuitry 229. Compensation signal 228 comprises a sequence of written-in repeatable run-out values. In an illustrative embodiment, the compensation values are stored within the servo fields of the corresponding track. In a further illustrative embodiment, each compensation value is stored in the servo field of the servo sector for which the compensation value is intended to compensate for the written-in run-out. In an alternative embodiment, a compensation value corresponding to a given servo sector (or servo field) is stored in the servo field of the preceding servo sector and buffered by the servo system to insure that the servo system can write-protect over the user data in case an off-track condition is detected.

Compensation circuit 229 retrieves and demodulates the compensation values stored in the servo fields and produces compensation signal 228. Subtractor 234 subtracts the compensation value 228 associated with each servo sector from a corresponding servo value. In FIG. 4, the compensation signal 228 is subtracted from the position error signal 226, resulting in a compensated position error signal 236 comprising a sequence of compensated position error values. However, those skilled in the art will recognize that the compensation signal 228 can be subtracted at other locations within the servo loop 232. If the compensation values 228 are equal to the written-in error at the servo fields, the compensated position error signal 236 will contain only non-repeatable components. This result is provided to servo controller 210, which then drives the actuator based on the compensated position error signal 236 instead of the uncompensated position error signal 226. This forces the head to follow, except for non-repeatable disturbances, substantially circular and equally spaced tracks and causes the head to remain substantially still in inertial space with little acceleration from the servo system. Thus the effects of written-in error, $d_w$ 218, are substantially eliminated.

Figure 5:
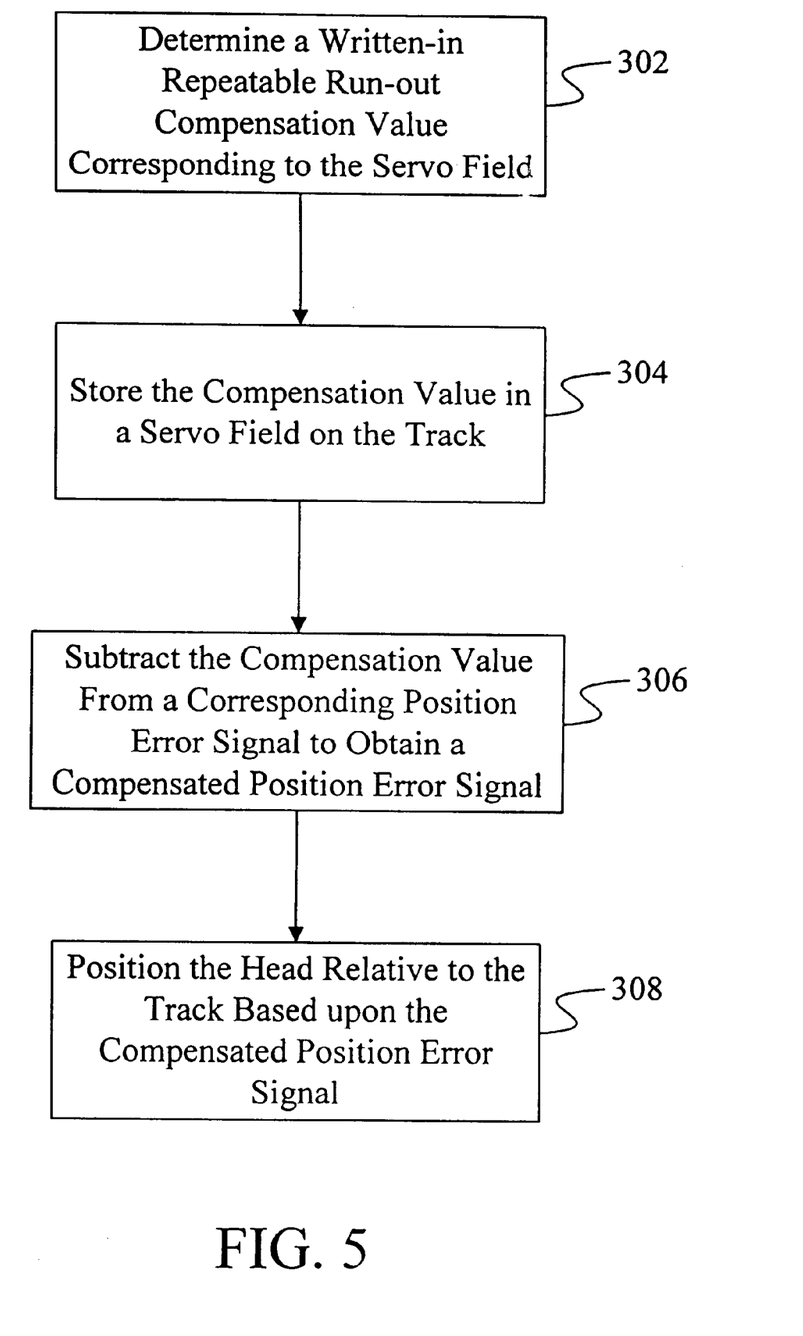
FIG. 5 is a flowchart representing a method of compensating for written-in repeatable run-out errors in a disc drive according to an illustrative embodiment of the present invention.

FIG. 5 is a flow chart illustrating a method of compensating for written-inrepeatable run-out in a disc drive in accordance with an illustrative embodiment of the present invention. At step 302, a written-in repeatable run-out compensation value corresponding to a servo field (or sector) of a given track is determined. At step 304, the compensation value is stored in a servo field on the track. In an illustrative embodiment, each compensation value is stored in the servo field of the servo sector for which the compensation value is intended to compensate for the written-in run-out. In an alternative embodiment, a compensation value corresponding to a given servo sector (or servo field) is stored in the servo field of the preceding servo sector and buffered by the servo system to insure that the servo system can write-protect over the user data in case an off-track condition is detected. In another alternative embodiment, the compensation values are stored in off-disc memory, in RAM (random access memory), for example. At step 306, the compensation value is subtracted from a corresponding position error value to obtain a compensated position error value. The compensation value can alternatively be subtracted from any other point in the servo loop, instead of to the position error signal. At step 308, the servo controller drives the actuator to position the head based on the compensated position error value.

Figure 6:
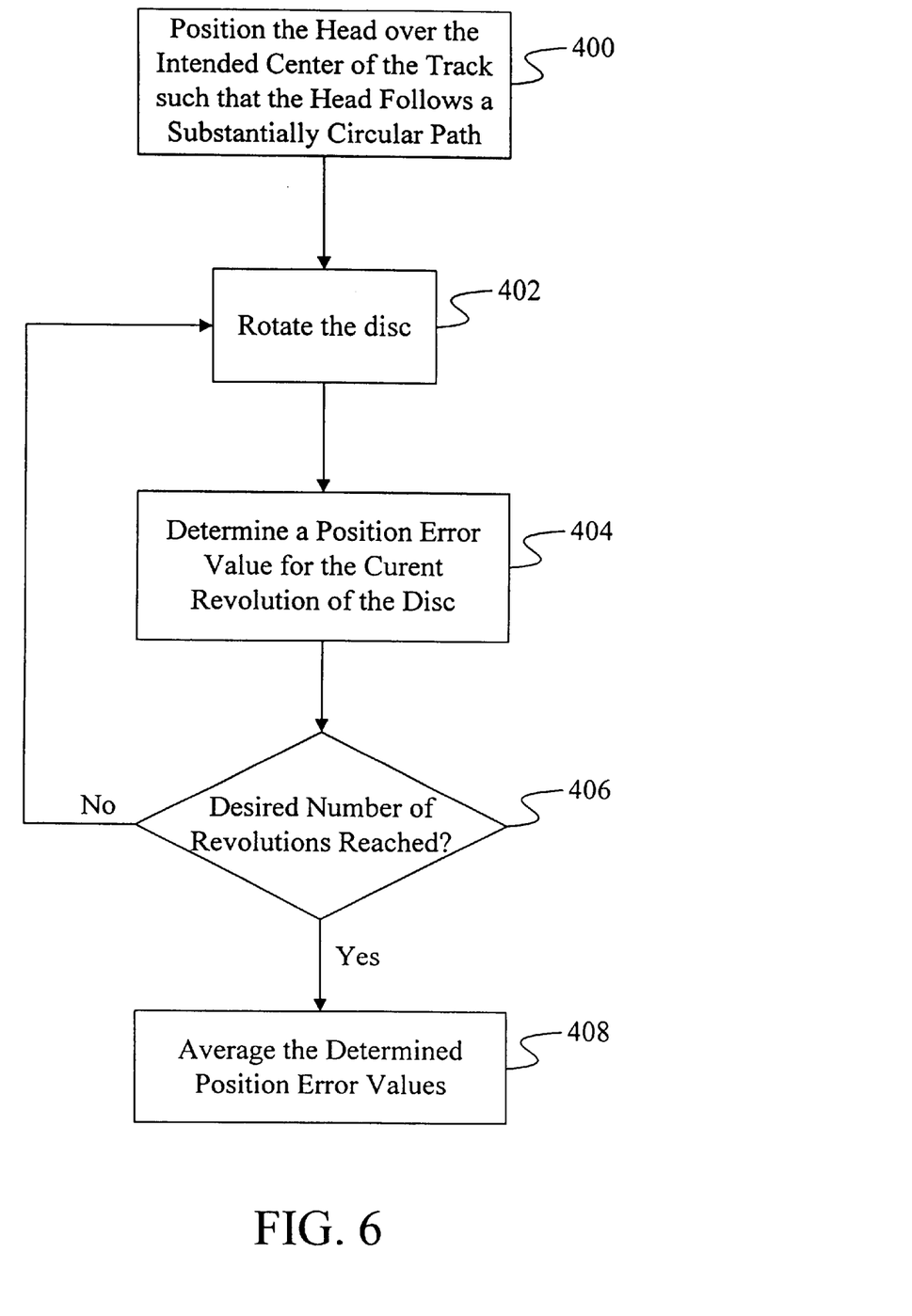
FIG. 6 is a flow chart representing a method of determining a written-in repeatable run-out compensation value according to the present invention.

According to an illustrative embodiment of the present invention, the step 302 of determining a written-in repeatable run-out compensation value corresponding to a servo field (or sector) of a given track is performed as follows, with reference to the flow chart of FIG. 6. To determine the correction word to be written at each servo bust, the initial servo information must be written just as is done in products today. After the tracks are written, the head is positioned over the intended center of the track such that the head follows a substantially circular path relative to the disc surface, as indicated at step 400. In an illustrative embodiment, the servo track writer positions the head over the track center based on the laser positioner, not the just written position error data. At this point, the head position in inertial space is defined by the laser positioner and will be quite stable except for any non-repeatable motions of the head relative to the just written track.

At step 402, the disc is rotated about the spindle axis. At step 404, the position error signal is demodulated just as it would be in the operational disk drive servo system. At state 406, it is queried whether the desired number of disc revolutions has been reached. To separate the repeatable component form the non-repeatable components of the position error word, the position error values from a plurality of disc revolutions are averaged, as indicated at step 408. The position error word from each sector is summed with the position error word from that same sector on the next revolution of the disk. This process is continued for enough revolutions to produce a good average of the repeatable portion of the position error word. The exact number of revolutions depends on the amount and magnitude of the non-repeatable components present. In a prototype built to demonstrate this concept, 16 revolutions was sufficient to average out the non-repeatable components and noise in the system.

After the averaging process is complete, each averaged position error value serves as the written-inrepeatable run-out compensation value for the associated servo field and is appended to the servo field (or the preceding servo field) from which it was derived, as explained above with respect to FIGS. 4 and 5. During normal operation of the disc drive, the servo system will read and subtract these correction values from the appropriate position error values. This forces the head to follow, except for non-repeatable disturbances, the circular and equally spaced tracks traced out by the servo track writer when it positions the head over the written servo tracks at the time the compensation values are determined. This causes the head to remain substantially still in inertial space with little acceleration from the servo system. If multiple accurate "sub tracks" are desired (i.e. for the offset between head's reader and writer), the servo track writer can position the head at other than the track center and a second or third etc. correction factor can be calculated and appended to the servo burst at the offset.

Mathematically restated, let B be the number of servo fields written on the disk surface (B>0). Let R be the number of revolutions used in the averaging process (R>0). Let the series W be the collection of demodulated position error words over R revolutions. Then $W_i$ will be the position error word demodulated at burst i (0<i<=R*B). Let the series C be the set of correction factors for one revolution. Then $C_j$ will be the correction factor for burst j (0<=j<B).

The correction factors can be expressed as:

$$C_j \equiv \frac{1}{R} \sum_{1}^{R} W\left(_{j+R}\right); \quad \text{EQ. 1}$$

$$0 <= j < B$$

The method of determining the written-in repeatable run-out factors discussed above also compensates for static track-to-track errors such as track squeeze, wherein the tracks are statically located closer together than the ideal spacing, resulting in a shift in the center of the track from the ideal center. This is because the highly accurate laser servo track writer is used to determine the final location of the track, not the servo demodulator and pattern.

In summary, one embodiment of the present invention is directed to a method of compensating for written-in repeatable run-out in a disc drive 100. A written-in repeatable run-out compensation value is stored in a servo field 204, 206 residing on a track 202. The compensation value 228 is subtracted from a corresponding servo value to obtain a compensated servo value. Then the head 112 is positioned relative to the track 202 based upon the compensated servo value.

In one embodiment of the present invention, the servo value from which the written-in repeatable run-out compensation value 228 is subtracted is the position error value 226.

Further, in one embodiment, the written-in repeatable run-out compensation values 228 are determined by first rotating the disc 106 about its spindle axis. The head 112 is then positioned over the intended center of the track 202 so that the head 112 follows an essentially circular path 200 relative to the disc surface 106. For each revolution of the disc 106, a servo value indicating the position of the head 112 relative to the track 202 at the servo field 204, 206 is determined. This step of determining a servo value is repeated over a plurality of revolutions and the servo values obtained are averaged in order to extract a non-repeatable portion of the run-out, resulting in a written-in repeatable run-out compensation value 228.

Another embodiment of the present invention is directed to a disc drive 100 having a servo loop 232, a disc 106, a head 112, a servo controller 210, an actuator 122 and a compensation circuit 229. The disc 100 is capable of storing data on a track 202. The track 202 includes servo fields 204, 206 capable of storing servo information used to indicate the position of a head 112 relative to the track 202. The servo fields 204, 206 are also capable of storing a written-in repeatable run-out compensation value 228 indicative of an amount of written-inrepeatable run-out of the track 202 at a given portion of the track 202. The head 112 is capable of sensing the servo information located on the disc 100 and of producing a servo position signal 222 therefrom. The servo position signal 222 is combined with a reference signal 224 to produce a position error signal 226 indicative of the difference between the actual and desired positions of the head 112 relative to the track 202. The servo controller 210 is capable of generating a servo control signal 214 in response to a received position error signal 236. The actuator 122 is coupled to the servo controller 210 and is capable of moving the head 112 in response to the servo control signal 214. The compensation circuit 229 is capable of retrieving a written-in repeatable run-out compensation value stored in a servo field of the track and providing the compensation value 228 to a subtractor 234. The subtractor 234 is capable of subtracting the written-in repeatable run-out compensation value 228 from a servo signal (226, e.g.) in the servo loop 232.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, the written-in repeatable run-out compensation of the present invention may be employed in disc drives that use non-magnetic data storage means, for example, optical storage devices. Other modifications can also be made.

What is claimed is:

1. A method of compensating for written-in repeatable run-out in a disc drive having a servo loop for positioning a head relative to a track on a disc surface based on a servo position signal comprising a sequence of servo position values indicative of a position of the head relative to the track comprising steps of:

(a) storing a written-in repeatable run-out compensation value in a servo field residing on the track;

(b) subtracting the compensation value from a corresponding servo value to obtain a compensated servo value; and (c) positioning the head relative to the track based upon the compensated servo value; and (d) prior to step (a), using a servo device external to the disc drive to position the head over an intended center of the track using laser positioning to determine the written-in repeatable run-out compensation value.

2. The method of claim 1, wherein determining step (d), comprises steps of:

(d) (i) rotating the disc about a spindle axis of the disc;

(d) (ii) positioning the head over the intended center of the track such that the head follows a substantially circular path relative to the disc surface;

(d) (iii) for a given revolution of the disc, determining a servo value indicative of a position of the head relative to the track at the servo field;

(d) (iv) repeating determining step (d) (iii) over a plurality of revolutions; and (d) (v) averaging the servo values obtained in determining and repeating steps (d) (iii) and (d) (iv), thereby extracting a non-repeating portion of the run-out and resulting in a written-in repeatable run-out compensation value.

3. The method of claim 2 wherein determining step (d) (iii) comprises determining a position error value based on a difference between an actual and a desired position of the head relative to the track at the servo field.

4. The method of claim 1 wherein a written-in repeatable run-out compensation value corresponding to a given servo field is stored in the given servo field itself.

5. The method of claim 1 wherein a written-in repeatable run-out compensation value corresponding to a given servo field is stored in a preceding servo field.

6. The method of claim 1 wherein the servo loop is adapted for positioning the head relative to the track based on a position error value based on a difference between an actual and a desired position of the head relative to the track at the servo field, wherein subtracting step (b) comprises subtracting the compensation value from a corresponding position error value to obtain a compensated position error value and wherein positioning step (c) comprises positioning the head relative to the track based upon the compensated position error value.

* * * * *

UNITED STATES PATENT AND TRADEMARK OFFICE
CERTIFICATE OF CORRECTION

PATENT NO. : 6,392,834 B1  Page 1 of 1
DATED : May 21, 2002
INVENTOR(S) : Ellis It is certified that error appears in the above-identified patent and that said Letters Patent is hereby corrected as shown below:

Column 8,
Line 5, delete "and".

Signed and Sealed this

Eleventh Day of March, 2003

JAMES E. ROGAN
*Director of the United States Patent and Trademark Office*